United States Patent
Wargin et al.

(10) Patent No.: US 8,332,870 B2
(45) Date of Patent: Dec. 11, 2012

(54) ADAPTER SERVICES

(75) Inventors: Jeffrey M. Wargin, Rancho Palos Verdes, CA (US); Andy I-Hong Chen, Chicago, IL (US)

(73) Assignee: Accenture Global Services Limited, Dublin (IE)

( * ) Notice: Subject to any disclaimer, the term of this patent is extended or adjusted under 35 U.S.C. 154(b) by 1035 days.

(21) Appl. No.: 12/331,689

(22) Filed: Dec. 10, 2008

(65) Prior Publication Data

US 2010/0082689 A1 Apr. 1, 2010

Related U.S. Application Data

(60) Provisional application No. 61/101,633, filed on Sep. 30, 2008.

(51) Int. Cl.
*G06F 9/46* (2006.01)

(52) U.S. Cl. ........ 719/315; 719/316; 707/602; 707/756; 707/802; 707/809; 707/810

(58) Field of Classification Search ........................ None
See application file for complete search history.

(56) References Cited

U.S. PATENT DOCUMENTS

| | | | | |
|---|---|---|---|---|
| 5,991,823 A | | 11/1999 | Cavanaugh, III et al. | 709/304 |
| 6,018,743 A | | 1/2000 | Xu | 707/103 |
| 6,134,559 A | | 10/2000 | Brumme et al. | 707/103 |
| 6,199,195 B1 | * | 3/2001 | Goodwin et al. | 717/104 |
| 6,523,042 B2 | | 2/2003 | Milleker et al. | 707/102 |
| 6,529,948 B1 | * | 3/2003 | Bowman-Amuah | 709/217 |
| 6,621,505 B1 | * | 9/2003 | Beauchamp et al. | 715/764 |
| 6,665,662 B1 | * | 12/2003 | Kirkwood et al. | 1/1 |
| 6,944,604 B1 | * | 9/2005 | Majoor | 706/45 |
| 7,043,687 B2 | | 5/2006 | Knauss et al. | 715/513 |
| 7,162,534 B2 | | 1/2007 | Schleiss et al. | 709/232 |
| 2001/0034733 A1 | * | 10/2001 | Prompt et al. | 707/102 |
| 2002/0010741 A1 | * | 1/2002 | Stewart et al. | 709/204 |
| 2002/0038309 A1 | * | 3/2002 | Perkins et al. | 707/104.1 |
| 2002/0046301 A1 | * | 4/2002 | Shannon et al. | 709/328 |
| 2002/0069083 A1 | * | 6/2002 | Harter et al. | 705/1 |
| 2002/0073236 A1 | * | 6/2002 | Helgeson et al. | 709/246 |
| 2002/0091702 A1 | * | 7/2002 | Mullins | 707/100 |
| 2002/0099579 A1 | * | 7/2002 | Stowell et al. | 705/7 |
| 2002/0108099 A1 | * | 8/2002 | Paclat | 717/102 |
| 2002/0111922 A1 | * | 8/2002 | Young et al. | 705/80 |
| 2002/0120917 A1 | * | 8/2002 | Abrari et al. | 717/110 |
| 2002/0122054 A1 | * | 9/2002 | Hind et al. | 345/731 |
| 2002/0129052 A1 | * | 9/2002 | Glazer et al. | 707/501.1 |
| 2002/0138449 A1 | * | 9/2002 | Kendall et al. | 705/75 |
| 2002/0138543 A1 | * | 9/2002 | Teng et al. | 709/102 |
| 2002/0147726 A1 | * | 10/2002 | Yehia et al. | 707/101 |
| 2002/0161840 A1 | * | 10/2002 | Willcox et al. | 709/206 |
| 2002/0169658 A1 | * | 11/2002 | Adler | 705/10 |

(Continued)

*Primary Examiner* — Andy Ho
*Assistant Examiner* — Shih-Wei Kraft
(74) *Attorney, Agent, or Firm* — Brinks Hofer Gilson & Lione

(57) ABSTRACT

In one example, a system to integrate a first application with a second application may associate a component type in the first application with an engine object type in the second application. The component type and the engine object type may be program object types. The system may determine a hierarchical structure that includes an engine object of the engine object type from configurable rules that are associated with the component type. The system may initiate a copy of the engine object in the second application in response to receipt of a request to copy a component of the component type in the first application.

17 Claims, 5 Drawing Sheets

U.S. PATENT DOCUMENTS

| | | | |
|---|---|---|---|
| 2002/0194181 A1* | 12/2002 | Wachtel | 707/10 |
| 2003/0023604 A1* | 1/2003 | O'Brien et al. | 707/100 |
| 2003/0028540 A1* | 2/2003 | Lindberg et al. | 707/100 |
| 2003/0046639 A1* | 3/2003 | Fai et al. | 715/513 |
| 2003/0050929 A1* | 3/2003 | Bookman et al. | 707/7 |
| 2003/0078949 A1* | 4/2003 | Scholz et al. | 707/505 |
| 2003/0084056 A1* | 5/2003 | DeAnna et al. | 707/100 |
| 2003/0101235 A1* | 5/2003 | Zhang | 709/218 |
| 2003/0163783 A1* | 8/2003 | Chikirivao et al. | 715/513 |
| 2003/0195762 A1* | 10/2003 | Gleason et al. | 705/1 |
| 2003/0212654 A1* | 11/2003 | Harper et al. | 707/1 |
| 2003/0221184 A1* | 11/2003 | Gunjal et al. | 717/118 |
| 2003/0226111 A1* | 12/2003 | Wirts et al. | 715/514 |
| 2003/0229605 A1* | 12/2003 | Herrera et al. | 706/47 |
| 2004/0010776 A1* | 1/2004 | Shah | 717/117 |
| 2004/0019670 A1* | 1/2004 | Viswanath | 709/223 |
| 2004/0030421 A1* | 2/2004 | Haley | 700/49 |
| 2004/0034848 A1* | 2/2004 | Moore et al. | 717/117 |
| 2004/0044987 A1* | 3/2004 | Kompalli et al. | 717/100 |
| 2004/0078725 A1* | 4/2004 | Little et al. | 714/48 |
| 2004/0083199 A1* | 4/2004 | Govindugari et al. | 707/1 |
| 2005/0015619 A1* | 1/2005 | Lee | 713/201 |
| 2005/0022171 A1 | 1/2005 | Langkafel et al. | 717/136 |
| 2005/0097008 A1* | 5/2005 | Ehring et al. | 705/26 |
| 2005/0251527 A1* | 11/2005 | Phillips et al. | 707/101 |
| 2005/0262032 A1* | 11/2005 | Smith | 706/47 |
| 2006/0074734 A1* | 4/2006 | Shukla et al. | 705/8 |
| 2006/0095274 A1* | 5/2006 | Phillips et al. | 705/1 |
| 2006/0129978 A1* | 6/2006 | Abrari et al. | 717/110 |
| 2006/0179042 A1* | 8/2006 | Bram et al. | 707/3 |
| 2006/0271600 A1* | 11/2006 | Goh et al. | 707/201 |
| 2006/0287890 A1* | 12/2006 | Stead et al. | 705/3 |

* cited by examiner

ADAPTER SERVICES

PRIORITY

This application claims priority under 35 U.S.C. §119(e) to U.S. Provisional Application No. 61/101,633, entitled "ADAPTER SERVICES," filed Sep. 30, 2008, the entire contents of which are hereby incorporated herein by reference.

TECHNICAL FIELD

This application relates to systems and, in particular, to integration.

BACKGROUND

In the insurance industry, insurance applications have been written that enable users, such as insurance policy salespeople, to sell insurance products. When an insurance company desires to sell a new insurance product, or to make structural changes to existing products, the insurance applications often need extensive reprogramming. Such efforts may involve years of work.

To compound the problem, insurance applications may be integrated with other applications that perform various features. For example, insurance applications may be integrated with a rules engine to enable customization of business logic and decisioning through manipulation of business rules. Examples of rules engines include BLAZE ADVISOR® engine from Fair Isaac Corporation of Minnesota and INSBRIDGE® Suite from Insbridge, Inc. of Texas. The integration between an insurance application and the rules engine may be extensive and not easily changed.

BRIEF SUMMARY

A system to integrate a first application with a second application may associate a component type in the first application with an engine object type in the second application. The component type and the engine object type may be program object types. The component type and other component types may be arranged in a first hierarchical structure. The engine object type and other engine object types may be included in a second hierarchical structure. The first hierarchical structure may be different than the second hierarchical structure. The system may determine the second hierarchical structure from configurable rules that are associated with the component type. The first application may include a component that is of the component type. The second application may include an engine object that is of the engine object type. The system may initiate a copy of an engine object in the second application in response to receipt of a request to copy the component in the first application. The engine object may be arranged with other engine objects in accordance with the second hierarchical structure, where each of the engine objects may be of a corresponding one of the engine object types.

In addition, the system may perform other operations on the engine object in response to the operation being performed on the component. For example, the system may initiate the creation of the engine object in response to the creation of the component. Furthermore, the system may generate a Universal Resource Locator (URL) to access the engine object in the second application.

The system may include a computer readable medium that may include instructions to integrate a first application with a second application. The instructions may associate a component type in the first application with an engine object type in the second application. The component type, in addition to other component types, may be arranged in a first hierarchical structure. The engine object type in addition to other engine object types may be arranged in a second hierarchical structure. The first hierarchical structure may be different than the second hierarchical structure. The instructions may determine the second hierarchical structure from configurable rules associated with the component type. The first application may include a component that is of the component type. The second application may include an engine object that is of the engine object type. The engine object and additional engine objects may be arranged in the second hierarchical structure. Each of the engine objects in the second hierarchical structure may be of an engine object type that corresponds to one of the engine object types. The instructions may further initiate copying of the engine object in the second application in response to receiving a request to copy the component included in the first application.

The system may also include a method of integrating a first application and a second application. A component type in the first application may be associated with an engine object type in a second application. The engine object type may be included in a hierarchical structure of engine object types. Configurable rules may be associated with the component type. The hierarchical structure may be determined from the configurable rules. A copy of an engine object in the second application may be initiated in response to receipt of a request to copy a component in the first application, where the component is of the component type, the engine object is of the engine object type, and each of the engine objects is of a corresponding one of the engine object types. The engine objects may be arranged in accordance with the hierarchical structure.

Further objects and advantages of the present invention will be apparent from the following description, reference being made to the accompanying drawings wherein preferred embodiments of the present invention are shown.

BRIEF DESCRIPTION OF THE DRAWINGS

The innovation may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

DETAILED DESCRIPTION

Figure 1:
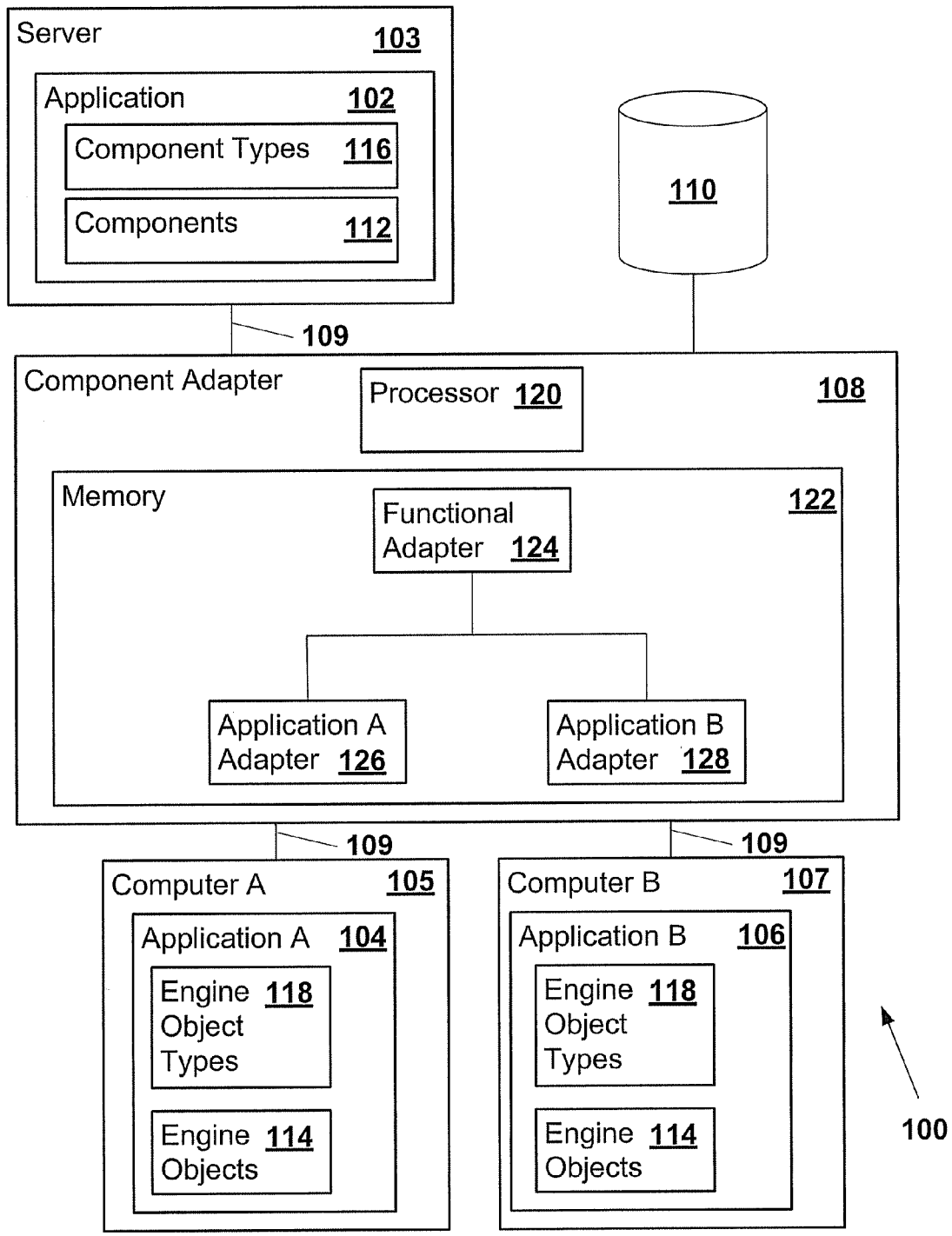
FIG. 1 is an example of a system to integrate an application with other applications using a component adapter.

FIG. 1 is an example of a system 100 to integrate an application 102 with other applications 104 and 106 using a component adapter 108. The system 100 may include the application 102, the component adapter 108, a database 110, and other applications 104 and 106 such as Application A 104 and Application B 106. In one example, the system 100 may include the component adapter 108 and the database 110, but not the application 102 and the other applications 104 and 106. In a different example, the system 100 may additionally include a server 103, a Computer A 105, and a Computer B 107, where the server 103 includes the application 103, Computer A 105 includes Application A 104, and Computer B 107 includes Application B 106. The system 100 may include more, fewer, or different elements, such as including additional or fewer applications and a network 109.

The application 102 may be in communication with the component adapter 108. For example, the application 102 may be in communication with the component adapter 108 over the network 109 to which the server 103 and the component adapter 108 are connected. The component adapter 108 may be in communication with Application A 104 and Application B 106. For example, the component adapter 108 may be in communication with Application A 104 and Application B 106 over the network 109. The network 109 may be a Local Area Network (LAN), a Wireless Local Area Network (WLAN), a Personal Area Network (PAN), a Wide Area Network (WAN), or any other now known or later developed communications network.

During operation, the component adapter 108 may handle communications between the application 102 and the other applications 104 and 106. For example, the application 102 may include one or more components 112. The other applications 104 and 106 may include one or more engine objects 114. Each of the components 112 and the engine objects 114 may be a program object included in the respective application. For example, one of the components 112 in the application 102 may be associated with one or more of the engine objects 114 in Application A 104. The component adapter 108 may initiate the creation, deletion, versioning, or deployment of the associated engine object 114 in response to the respective creation, deletion, version, or deployment of the component in the application 102. Two program objects are integrated if one or more operations applied to one of the program objects will be applied to the second one of the program objects. The component adapter 108 may receive commands from the application 102 operating on the component 112 that is associated with the engine object 114. For example, if the application 102 is to delete the component 112 that is associated with the engine object 114, the application 102 may transmit a delete command to the component adapter 108 indicating that the component 112 is to be deleted. The component adapter 108 may then communicate with the Application A 104 in order to initiate the deletion of the associated engine object 114.

Each of the application 102, Application A 104, and Application B 106 may be any software program that depends on an operating system to execute. Examples of such a software program include a web server, database server, word processor, network driver, network service, browser plug-in, a Customer Relationship Management program, an accounting program, a tax application, an insurance-related program, and an Enterprise Resource Planning program. A software program includes computer code and may be an operating system, an application or any combination thereof.

An operating system (OS or O/S) is software included in a computer system that is responsible for the management and coordination of activities and the sharing of the resources of the computer system. Examples of operating systems include MICROSOFT WINDOWS® from Microsoft Corporation in Washington, MAC OS® from Apple Computers, Inc. of California, and Internetwork Operating System (IOS®) from Cisco Technology, Inc. of California.

The application 102 may include components 112 and component types 116. The component 112 may be a program object included in the application 102, where one or more operations applied to the program object may be applied to one or more program objects included in a different application. A program object may be a conceptual entity that may contain data, a portion of executable code or a combination thereof. The program object may, for example, appear to the executable code as a contiguous block of computer memory of a specific size at a specific location, even if elements of the program object are not physically stored in a contiguous block of memory. Thus, the program object may represent one or more variables in a procedural programming model, one or more variables or objects in an object-oriented programming model, or any combination thereof. Examples of the program object include a sales order, a company, a contact, a product, a security role, and a business unit. The data included in the program object is known as state information.

The component type 116 may be a program object type of one or more of the components 112. A program object type may be a template structure for the program object. For example, the program object type may be a class, a collection of classes, a data type, a primitive data type, or any other structure common to each of the program objects of that program object type.

The program object is "of" the program object type where the program object conforms to the template structure included in the component type 116. For example, a Java object may be created based on a Java class using the Java programming language. The Java object is the program object and the Java class is the program object type. The code "Object x=new Object( );" creates the program object referenced by the variable name "x" from the class "Object." The Java object is said to be "of" a class where the class describes the template structure of the Java object. The program object "x" conforms to the template structure included in the class "Object." The template structure included in the program object type may include, for example, programming procedures, attributes, and any combination thereof.

The other applications 104 and 106 may include engine objects 114 and engine object types 118. the engine object 114 may be the program object included in one of the other applications 104 and 106, where one or more operations are applied to the program object in response to a respective one of the operations being applied to one or more components 112 included in the application 102. The engine object type 118 is the program object type of the engine object 114.

The component adapter 108 may be any computing device or combination of computing devices that includes a processor 120 and a memory 122 and that is operable to integrate two or more applications. In other examples, the component adapter 108 may include more or different elements. For example, the component adapter 108 may include the database 110, the application 102, Application A 104, Application B 106, and any combination thereof. Examples of the component adapter 108 may include a server, a server cluster, a laptop, a portable digital assistant, and a cell phone.

The processor 120 may be in communication with the memory 122. In other examples, the processor 120 may also be in communication with additional components, such as a network card. The processor 120 may be a general processor, central processing unit, server, application specific integrated circuit (ASIC), digital signal processor, field programmable gate array (FPGA), digital circuit, analog circuit, or combinations thereof. The processor 120 may be one or more devices operable to execute computer executable instructions in order to perform the functions of the component adapter 108.

The memory 122 may be any now known, or later discovered, data storage device. The memory 122 may be a non-volatile and/or volatile memory, such as a random access memory (RAM), a read-only memory (ROM), an erasable programmable read-only memory (EPROM), or flash memory. The memory may include an optical, magnetic (hard-drive) or any other form of data storage device.

The memory 122 may include computer code. The computer code may include instructions executable with the processor 120. The computer code may be written in any computer language now known or later discovered, such as C++, C#, Java, Pascal, Visual Basic, Perl, HyperText Markup Language (HTML), JavaScript, assembly language, and any combination thereof.

The computer code in the memory 122 may include a functional adapter 124 and one or more of the application adapters 126 and 128. The functional adapter 124 may receive a request from the application 102 and, based on the request received, determine which of the application adapters 126 and 128 should be sent what operations and which of the engine objects 114 should be operated on by the operations. In one example, each of the application adapters 126 and 128 may be limited to integration logic relevant to the specific corresponding application adapter 126 and 128. In such an example, the functional adapter 124 may include any functional logic common to the application adapters 126 and 128. The functional adapter 124 may perform logic based on configurable rules to integrate components 112 and engine objects 114. The application adapters 126 and 128 may execute any application-specific logic. In other examples, the computer code may be organized differently.

The database 110 may include a memory, such as the memory 122 included in the component adapter 108, with any electronic collection of information stored therein. The information may be organized so that the information may be accessed, managed, and updated. Examples of the database 110 include but are not limited to a Relational Database Management System (RDBMS), an object-oriented database, an extensible markup language (XML) database, a file system, memory structures, or other now known or later developed data organization and storage mechanism. The database may use any type of memory and structure, such as a random access memory (RAM), a read-only memory (ROM), an erasable programmable read-only memory (EPROM), flash memory, optical memory, magnetic (hard-drive or tape) memory or other memory device.

The application 102 may be in communication with the component adapter 108 using any communication method now known or later discovered. For example, computer code executing in a process and included in the application 102 may make a procedure call to the component adapter 108. In a different example, a remote method invocation (RMI) may be used where the application 102 and the component adapter 108 execute on different processes or even on different devices connected over the network 109. Examples of RMI include using Simple Object Access Protocol (SOAP), Microsoft Windows Communication Foundation (WCF™) from Microsoft Corporation of Washington, Common Object Requesting Broker Architecture (CORBA®) from Object Management Group, Inc. of Massachusetts, and Java RMI™ from Sun Microsystems, Inc. of California. Similarly, the component adapter 108 may be in communication with the other applications 104 and 106 using any communication method now known or later discovered.

During operation of the system 100, the system may associate one or more components 112 with one or more engine objects 114. The system 100 may create the engine objects 114 within a hierarchy of other engine objects 114. The component 112 may also be created within a hierarchy of other components 112. The hierarchy of engine objects 114 may differ from the hierarchy of components 112 in some examples. In other examples, the hierarchies may be the same.

Figure 2:
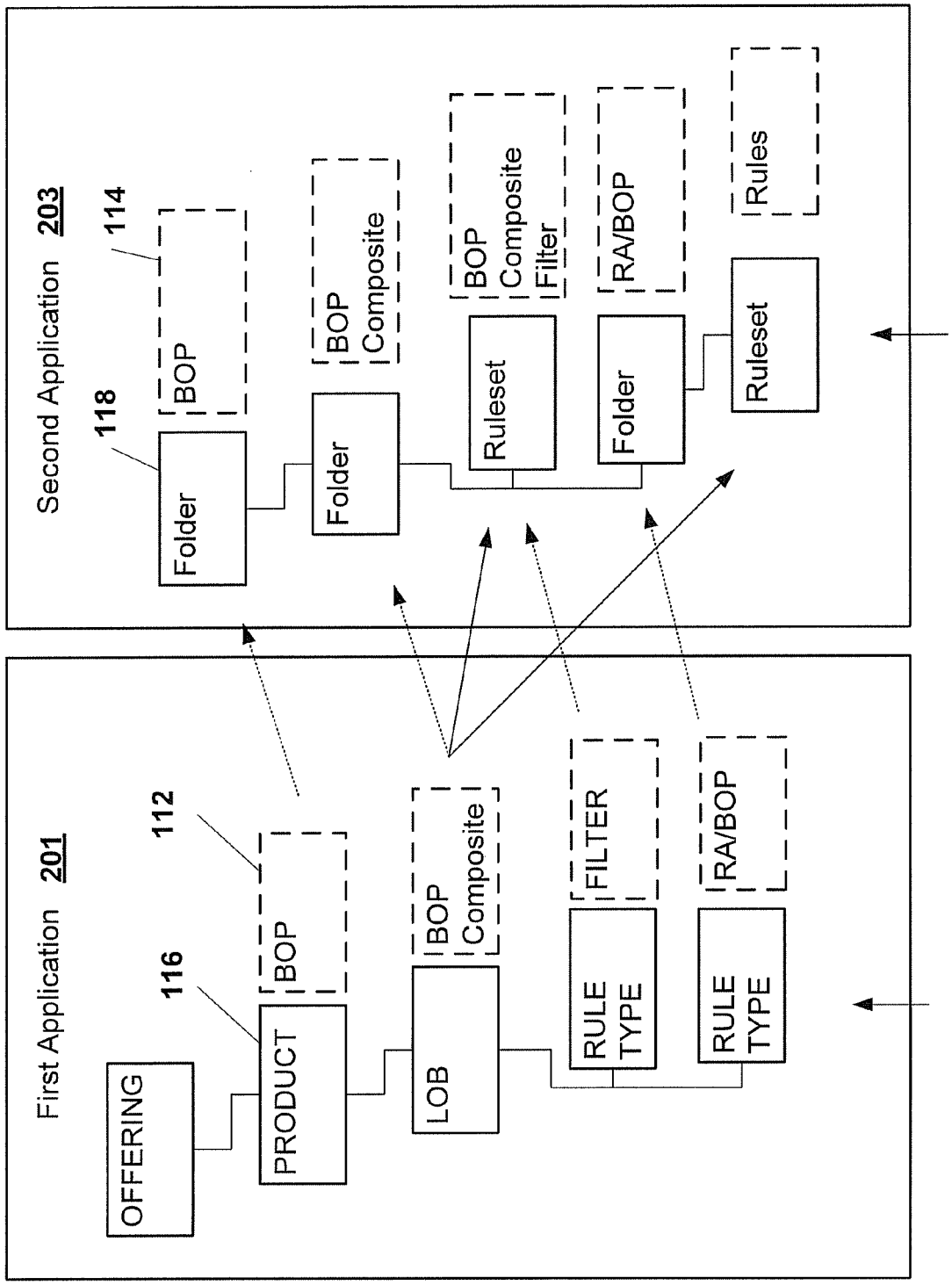
FIG. 2 is an example of components and component types in a first application and their relationships to engine objects and engine object types in a second application.

FIG. 2 illustrates examples of components 112 and component types 116 in a first application 201, engine objects 114 and engine object types 118 in a second application 203, and relationships between the components 112 and the engine objects 114. The components 112 and component types 116 may be arranged in a first hierarchical structure 202. The engine objects 114 and engine object types 118 may be arranged in a same or different second hierarchical structure 204.

In FIG. 2, the components 112 and component types 116 are insurance-related components 112 and component types 116. The component types 116 are "OFFERING," "PRODUCT," "LOB," and "RULE TYPE." For example, an "OFFERING" may be a group of insurance products that are to be offered for sale as a group; a "PRODUCT" may be an insurance product; a "LOB" may be a particular line of business covered by the insurance product; a "RULE TYPE" may be a collection of business rules. The component type "OFFERING" is a parent of "PRODUCT." The component type "LOB" is a child of "PRODUCT." The first "RULE TYPE" and the second "RULE TYPE" are children of "LOB." The components 112 are "BOP," "BOP Composite," "FILTER," and "RA/BOP" respectively. A "Filter" may be a set of rules that "filter" the appropriate rule sets to be executed based on meta-data of other component types and a "RA/BOP" may be a grouping of rules to evaluate the risk analysis of a Business Owners Policy product. Because "BOP" and "BOP Composite" correspond to "PRODUCT" and "LOB" respectively, "BOP Composite" is a child of "BOP."

In FIG. 2, the engine objects 114 and engine object types 118 are related to a business rules engine. The engine object types 118 are "Folder" and "Ruleset." The engine objects 114 are "BOP," "BOP Composite," "BOP Composite Filter," "RA/BOP," and "Rules." The engine object "BOP" is the parent of "BOP Composite." The engine object "BOP Composite" is the parent of "BOP Composite Filter" and "RA/BOP." The engine object "RA/BOP" is the parent of "Rules."

The component "BOP Composite" is associated with the engine object "BOP Composite Filter." The component "BOP Composite" is also associated with the engine object "Rules." Associations may be stored in and retrieved from the database 110. Alternatively or additionally, associations may be stored in a different database. The association between the component 112 and the engine object 114 indicate that operations on the component 112 are to be performed on the associated engine object 114. Operations may include, but are not limited to: create, delete, copy, and make new version. In one example, the life of the engine object 114 may be tied to the life of the associated component 112. The life of the engine object 114 includes the time from the creation of the engine object 114 to the time of the deletion of the engine object 114. Similarly, the life of the component 112 includes the time from the creation of the component 112 to the time of the deletion of the component 112. The life of the engine object 114 may be tied to the life of the component 112 when the creation of the engine object 114 occurs at substantially the same time as the creation of the component 112 and when the deletion of the engine object 114 occurs at substantially the same time as the deletion of the component 112. In a different example, the life of the engine object 114 may be partially tied to the life of the associated component 112. The life of the engine object 114 may be partially tied to the life of the component 112 when the creation of the engine object 114 occurs at substantially the same time as the creation of the component 112, but the deletion of the engine object 114 does not occur at substantially the same time as the deletion of the component 112. A first event occurs at substantially the same time as a second event if an automated process starts or is already started when the first event occurs that results in the occurrence of the second event, even if there is a time difference between the occurrences of the two events.

The application 102 or the component adapter 108 may associate the engine object 114 with the component 112 where the component 112 is of the determined component type 116. A component 112 is of the determined component type 116, where the component 112 conforms to a template structure included in the determined component type 116. For example, the application 102 may associate a "Ruleset" engine object with a "BOP Composite" component because the "BOP Composite" component is of a "LOB" component type. In one example, the determined component type 116 may be the component type 116 that has children that are of another determined component type. Alternatively, or additionally, the determined component type 116 may be the component type 116 that has a determined attribute, a determined base class, or any other distinguishing indicator. In a different example, the application 102 or the component adapter 108 may associate the engine object 114 with the component 112 where the component 112 has a determined value set for a determined property, such as "associate=true."

In contrast, the component "BOP Composite" corresponds to the engine object "BOP Composite," but is not associated with the engine object "BOP Composite." The component 112 may correspond to the engine object 114 when the component 112 shares a substantially similar location within the first hierarchical structure 202 of the components 112 as the location of the engine object 114 within the second hierarchical structure 204 of the engine objects 114. A first location in the first hierarchical structure 202 is substantially similar to a second location in the second hierarchical structure 204 where the first location shares the same organizational level as the second location. Similarly, the component "BOP" corresponds to the engine object "BOP," but is not associated with the engine object "BOP."

The life of the component 112 that corresponds to the engine object 114 but that is not also associated with the engine object 114, may not, in some examples, be tied or partially tied to the life of the engine object 114. In other examples, the life of the component 112 may be tied or partially tied to the life of the associated engine object 114. In a different example, the life of the component 112 may not be tied in any way to the life of the engine object 114.

Similar to the component 112, the component type 116 may correspond to the engine object 114 when the component type 116 shares a substantially similar location within the first hierarchical structure 202 of component types 116 as the location of the engine object 114 within the second hierarchical structure 204 of the engine objects 114. For example, the first component type "RULETYPE" corresponds to the engine object "BOP Composite Filter." The second component type "RULETYPE" corresponds to the engine object "RA/BOP." The engine object "Rules" does not correspond to any component 112 or component type 116, because the engine object "Rules" does not share the same organizational level. However, the engine object "Rules" is associated with the component "BOP Composite" in the database 110.

The component type 116 that is associated with, and/or corresponding to, the engine object type 118 may be different from the engine object type 118. For example, the component type 116 may be an Insurance Policy Coverage Type and the associated engine object type 118 may be a Rule Set type used to calculate insurance premiums. The Insurance Policy Coverage Type is the component type 118 that represents an insurance coverage that may be included in an insurance policy. For example, "Collision" and "Comprehensive" are insurance coverages may be present on an Automobile insurance policy. A Rule Set Type is the engine object type 118 that represents a collection of related business rules that will be executed concurrently when invoked. For example, a set of rules may determine the amount of insurance premium that is associated with particular insurance policy coverage. The Insurance Policy Coverage Type is quite different from the Rule Set Type. However, the application 102 may invoke a collection of rules of a Rule Set Type in order to determine the amount of insurance premium desired for an insurance policy coverage component of the Insurance Policy Coverage Type. In a different example, the component type 116 may be the Insurance Product Type and the associated engine object type 118 may be a form in a document management system that is used to generate a policy contract document for an insurance product. The Insurance Product Type is quite different from the form in the document management system.

During operation of the system 100, the component adapter 108 may initiate operations on one or more engine objects 114 in order to maintain the second hierarchical structure 204 of the engine objects 114. The component adapter 108 may receive an operation directed to the component 112 from the application 102. The functional adapter 124 may determine, for example, if the component 112 is—or should be—associated with the engine object 114. The functional adapter 124 may retrieve configurable rules from the database 110. The functional adapter 124 may determine the second hierarchical structure 204 of the engine objects from the configurable rules. The functional adapter 124 may also determine the names of the engine objects 114 in the second hierarchical structure 204, the engine object types 118 of the engine objects 114, other properties of the engine objects 114, or any combination thereof from the configurable rules. The functional adapter 124 may determine whether one or more of the engine objects 114 already exist, and which engine objects 114 should be created or otherwise operated on.

The functional adapter 124 may determine which of the application adapters 126 or 128 is in communication with the other application 104 or 106 that includes or should include the engine objects 114. The functional adapter 124 may, for each of the engine objects 114 to be operated on or created, invoke the appropriate application adapter 126 or 128 to operate on the respective engine object 114. The application adapter 126 or 128 accordingly initiates a request to the other application 104 or 106 to operate on the engine object 114. The application adapter 126 or 128 may return information about the engine object 114, such as an identifier, to the functional adapter 124. The functional adapter 124 may store the returned information in the database 110. The returned information may include Extensible Markup Language (XML) or other data that the functional adapter 124 stores. When the functional adapter 124 later invokes the application adapter 126 or 128, the functional adapter 124 may pass the XML or other data to the application adapter 126 or 128 unmodified from how the XML or other data was originally received with the functional adapter 124. The functional adapter 124 thereby provides any application adapter 126 or 128 with a storage and retrieval mechanism.

Figure 3:
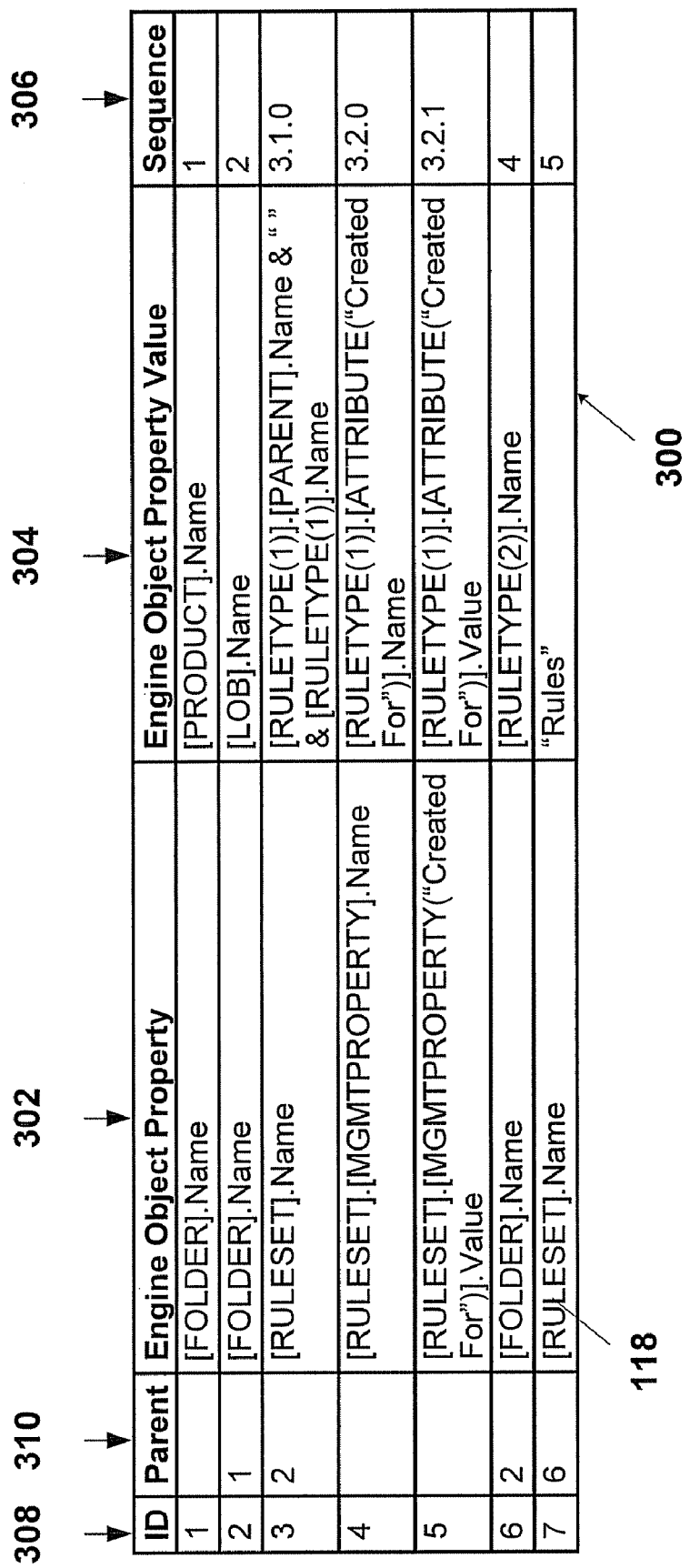
FIG. 3 is an example of configurable rules interpreted by the functional adapter.

FIG. 3 is an example of configurable rules interpreted by the functional adapter 124. Each row of the table 300 in FIG. 3 corresponds to a configurable rule. Each rule may include an identification of a property 302 of the engine object 114 and an identification of how to calculate a property value 304 of the property 302.

Each rule may include a sequence number 306 to indicate an order in which the rules are to be processed. The sequence number 306 may include multiple parts. Each of the parts may correspond to different positions within the sequence number 306. For example, a first part of the sequence number 306 may indicate the order in which to create the corresponding engine object 114. Sequence numbers 306 sharing the same value for the first part of the sequence numbers 306 may correspond to the same engine object 114. Sequence numbers 306 sharing the same value for a second part of the sequence number 306 may correspond to the same property of the engine object 114. Yet another part constituting a third part of the sequence number 306 may indicate the order in which to identify and set one property. In different examples, the sequence number 306 may only include one part and indicate the order in which the configurable rules should be executed. In still other examples, the configurable rules may not include sequence numbers 306 and be executed in the order the configurable rules are retrieved from the database 110.

Each of the configurable rules may include an identifier to identify the engine object 114 to which the respective configurable rule is to apply. For example, the first part of the sequence number 306 in FIG. 3 includes the identifier to identify the engine object 114 to which the respective configurable rule is to apply. For example, the rules illustrated in FIG. 3 operate on five distinct engine objects 114 as indicated by the first part of the sequence number 306.

The engine object type 118 referred to in the last of the configurable rules associated with the component 112 may correspond to the engine object 114 that is also associated with the component 112. The other engine objects 114 to be operated on with the corresponding configurable rules may be engine objects 114 that are not associated with the component 112. Alternatively or additionally, each of the configurable rules may optionally indicate the associated component 112 (not shown).

The functional adapter 124 may determine the engine object types 118, the second hierarchical structure 204 of the engine object types 118, and the corresponding engine objects 114 from the configurable rules. For example, the identification of the property 302 of the engine object 114 may include identification of the corresponding engine object type 118. For example, the syntax of "[RULESESET].Name" identifies the engine object type 118 within the brackets and additionally an attribute of the engine object type 118. In this example, the engine object type 118 is "Ruleset," and the property of the engine object 114 or the engine object type 118 is "Name."

The functional adapter 124 may evaluate a text-based expression configured for the property 302 and/or property value 304 in order to determine the property 302 and/or property value 304. The syntax of the text-based expression may permit any engine object type 118, or more broadly, any program object type, to be specified within brackets. The functional adapter 124 may evaluate the text-based expression in order to determine a program object or program object type on which to lookup the property. The functional adapter 124 may also lookup a value of the identified properties of the program objects or program object types.

Additionally or alternatively, the functional adapter 124 may determine the second hierarchical structure 204 from a rule identifier 308 and a parent identifier 310 included in each of the configurable rules. For example, the configurable rule that has the parent identifier 310 and that applies to the engine object 114, may indicate that the engine object 114 is a child of a parent of the engine object 114. The second configurable rule in FIG. 3 is one such example. The configurable rule that has no parent identifier 310 may apply to the engine object 114 that is located at the top of the second hierarchical structure 204. The first configurable rule in FIG. 3 is one such example. However, the configurable rule that has no parent identifier 310 may apply to the engine object 114 already located in the second hierarchical structure 204. The fourth and fifth configurable rules are such examples.

The configurable rules may be stored in any format and configured using any language. For example, instead of using rows in a table as in FIG. 3, the configurable rules may be stored as XML. For example:

```
<objects>
<object id=1>
    <type>Folder</type>
    <property>
        <name>Name</name>
        <value>[PRODUCT].Name</value>
    </property>
</object>
<object id=2 parent=1>
    <type>Folder</type>
    <property>
        <name>Name</name>
        <value>[LOB].Name</value>
    </property>
</object>
<object id=3 parent=2>
    <type>Ruleset</type>
    <associatedComponentType>LOB</associatedComponentType>
    <property>
        <name>Name</name>
        <value>[RULETYPE(1)].[PARENT].Name &
                " " &[RULETYPE(1)].Name</value>
    </property>
</object>
<object id=4 parent=2>
    <type>Folder</type>
    <property>
        <name>Name</name>
        <value>[RULETYPE(2)].Name</value>
    </property>
    <property>
        <name>[MGMTPROPERTY].Name</name>
        <value>[RULETYPE(1)].[ATTRIBUTE("Created For")].Name</value>
    </property>
    <property>
        <name>[MGMTPROPERTY("Created For")].Value</name>
        <value>[MGMTPROPERTY("Created For")].Value </value>
    </property>
</object>
<object id=5 parent=4>
    <type>Ruleset</type>
    <associatedComponentType>LOB</associatedComponentType>
    <property>
        <name>Name</name>
        <value>"Rules"</value>
    </property>
</object>
</objects>
```

Each of the "object" elements of the XML describes engine objects 114 in the second hierarchical structure 204. The "id" and "parent" attributes describe the second hierarchical structure 204. The "type" element identifies the engine object type 118 of the engine object 114. Each of the "property" elements describes a name of a property of the engine object 114 and a corresponding value. Those engine objects 114 associated with the component 112 may be indicated with the "associatedComponentType" element, for example. The associated component type indicates the component type 116 of the component 112 that is associated with the engine object 114.

In other examples, a different text-based language may be used in the configurable rules. Examples of the text-based language include XML, Visual Basic Script, and JavaScript.

The configurable rules may be associated with one or more component types 116. In one example, an effective start date and an effective end date may be associated with a set of configurable rules or with a determined subset of the configurable rules. Thus, configurable rules may be partially or completely replaced at a determined point in time and/or during a determined time period. For example, two or more sets of configurable rules may both be associated with the component type 116. Of the two or more sets of configurable rules, a first set of configurable rules may be effective during a first time period and a second set of configurable rules may be effective during a second time period. Engine objects 114 created during the second time period may be created within a different second structure than was created during the first time period.

In one example, a graphical user interface may be used by a user to manually configure the configurable rules. A graphical user interface (GUI) is a type of user interface which enables users to interact with electronic devices such as computers, hand-held devices (MP3 Players, Portable Media Players, Gaming devices), household appliances and office equipment. The GUI may offer graphical icons, and visual indicators as opposed to text-based interfaces, typed command labels or text navigation to fully represent the information and actions available to the user. The actions may be performed through direct manipulation of the graphical elements. More generally, a user interface is software, hardware, or a combination thereof through which users interact with a machine, device, computer program or any combination thereof.

Each of the application adapters 126 and 128 may implement a common programming interface for receiving requests from the functional adapter 124. The common programming interface may enable the functional adapter 124 to be programmed by a software developer without prior knowledge of the other applications 104 and 106 that are in communication with the application adapters 126 and 128. Examples of programming procedures included in the common programming interface are listed in Table 1 in addition to input and output program object types corresponding to each of the programming procedures.

TABLE 1

| Function | Input Data Object | Output Data Object |
| --- | --- | --- |
| Create New Engine Object | New Engine Object | Resulting Engine Object, Adapter Status |
| Create New Engine Object Version | Existing Engine Object | Resulting Engine Object, Adapter Status |
| Copy Existing Engine Object | Existing Engine Object, New Engine Object | Resulting Engine Object, Adapter Status |
| Remove Engine Object | Existing Engine Object | Adapter Status |
| Generate URL | Existing Engine Object( ) | Adapter URL( ), Adapter Status |
| Deploy Object Model | Object Model XSD, Existing Engine Object | Adapter Status |

Details of some of the program objects identified in Table 1 are given below in Tables 2-5. An example New Engine Object is described in Table 2. The New Engine Object may be used whenever the new engine object 114 is to be created, either by a Create New Engine Object or a Copy Existing Engine Object programming procedure.

TABLE 2

New Engine Object

| Members | Data Type | Description |
| --- | --- | --- |
| Name | String | This may be the resolved name of the object. The functional adapter may determine the name from the configurable rules and pass it to the application adapter through this field. For example, "BOP." |
| Engine Object Type | String | This may be the engine object type of the engine object that is to be created. For example, "FOLDER" and "RULESET." |
| Engine Object Attributes( ) | Engine Object Attribute | This may be an array of attribute names and associated values that may be used when creating a new engine object. For example, an attribute name may be "version number" and an associated value may "2." |
| Parent Engine Object | Existing Engine Object | This is a reference to a direct "parent" engine object that this engine object is to be created under. If the engine object is to be created and the parent engine object of the engine object has already been created or already exists, a recursive list of parents is unnecessary when creating the engine object. |

An example Existing Engine Object is described in Table 3. The Existing Engine Object may represent an object that has already been created in one of the other applications 104 or 106 that is in communication with the application adapter 126 or 128. The Existing Engine Object may be passed to the programming procedure, where an operation is to apply to the existing engine object. Examples of such programming procedures include Copy Existing Engine Object, Create New Engine Object Version, and Remove Engine Object. The Resulting Engine Object may be the same program object type as the Existing Engine Object.

TABLE 3

Existing Engine Object

| Members | Data Type | Description |
| --- | --- | --- |
| Engine Object Index ID | String | This may be a unique identifier that is generated by the application adapter when the engine object is first created. The Engine Object Index ID may be passed back to the functional adapter for storage in the database. The functional adapter may use the Engine Object Index ID to determine all references made to the existing engine object. |
| Engine Path XML | String | This may be an XML string that is stored in the database. The XML string may include any applicable information that the application adapter uses in order to locate the engine object within the application. The XML string may have been created and returned during the creation of the engine object to the functional adapter for storage in the database. |

An example Engine Object Attribute is described in Table 4. The Engine Object Attribute may include attribute key/value pairings that may be used when creating engine objects 114.

TABLE 4

Engine Object Attribute

| Members | Data Type | Description |
| --- | --- | --- |
| Key | String | This may be a name of a particular attribute of the engine object. |
| Value | String | This may be the value associated with the attribute key. |

TABLE 5

Adapter Status

| Members | Data Type | Description |
| --- | --- | --- |
| Success Flag | Boolean | This may indicate the success of the programming procedure executed by the application adapter |
| Additional Messages( ) | String | This may include any additional messages, such as error messages generated by the application adapter or the application. |

As described in Table 1, one example of a request that the functional adapter 124 may make is Create New Engine Object. During operation, the functional adapter 124 may invoke the application adapter 126 or 128 for each of the engine objects 114 that is to be created in an order determined by the configurable rules. For example, the order may be determined from the sequence number 306. Based on all of the configurable rules illustrated in FIG. 3, five different engine objects 114 are to be created. Thus, the functional adapter 124 may make five calls to the programming procedure Create New Engine Object based on the configurable rules. The "name" property of the New Engine Object passed on the first call may be "BOP." The "name" property of the New Engine Object passed on the next call may be "BOP Composite" and so on.

As described in Table 1, another example of the request that the functional adapter 124 may make is a Copy Engine Object. The Copy Engine Object includes the Existing Engine Object and the New Engine Object as inputs to the application adapter 126 and 128. During operation, the functional adapter 124 may determine the attributes of the New Engine Object. For example, the functional adapter 124 may hard-code the "name" attribute of the New Engine Object to be the name of the existing engine object 114 with "copy of" concatenated as a prefix. In other examples, the "name" attribute may be determined based on one of the configurable rule that sets the "name" attribute as described above. In still other examples, the application adapter 126 or 128 may ignore the name, other attributes, or a combination of both that are included in the New Engine Object.

The copy functionality implemented in the application adapter 126 or 128 may invoke copy functionality in the other application 104 or 106 if the other application 104 and 106 includes such functionality. Alternatively or additionally, the application adapter 126 and 128 may retrieve the engine object 114 and each of the child engine objects 114 from within the other application 104 and 106 and re-create the engine objects 114 in as copies in the other application 104 and 106.

As described in Table 1, another example of the request that the functional adapter 124 may make is a Create New Engine Object Version. The Create New Engine Object Version programming procedure may be implemented in the application adapter 126 and 128 using similar copy functionality as described above, but providing an updated engine object 114 name based on an attribute of an associated or related component 112, such as "version number." For the "copied" engine objects 114 that would not receive new names under the configurable rules, the application adapter 126 and 128 may not, in some examples, create new (versioned) copies. In one example, an "allow duplicates" mapping flag may allow the creation of new versioned copies of the same name. In other examples, the functional adapter 122 may determine naming of new versions of engine objects 114 based on configurable rules specific to a version. In still other examples, the application adapter 126 may use versioning capabilities of the application 126 and 128. For example, the application 126 and 128 may expose an Application Programmer Interface (API) that the application adapter 126 and 128 may use to implement the Create New Engine Object Version programming procedure.

As described in Table 1, another example of the request that the functional adapter 124 may make is a Remove Engine Object. The application adapter 126 and 128 may delete the engine object 114 identified in the Existing Engine Object. Alternatively or additionally, for example, the application adapter 126 and 128 may do nothing when Remove Engine Object is invoked. Alternatively or additionally, the functional adapter 124 may perform a "soft delete." The soft delete may mark the engine object 114 for deletion in, for example, the database 110. The engine object 114 marked for deletion may be determined from the database 110 and manually deleted using the other application 104 and 106 that includes the engine object 114. In one example, where the engine object 114 is a child of other engine objects 114, the functional adapter 124 may additionally initiate deletion of the parent engine objects 114.

As described in Table 1, the functional adapter 124 may also make a Generate URL request. In response, the application adapter 126 and 128 may return an Adapter Universal Resource Locator (URL). The Adapter URL may be a URL that provides a location to which the user may navigate in a web browser in order to view information relating to the engine object 114 identified in the Existing Engine Object. During operation, if the user is using the web browser to access the component 112 in the first application 201, the user may wish to select a link to view one or more associated engine objects 114 in the second application 203. If the application 102 and the other applications 104 and 106 are web-based, the transition from one application to another may appear seamless to the user. For example, the first application 201 may request the URL for the component 112 from the component adapter 108. The functional adapter 124 may make the Generate URL request to the application adapter 126 and 128 that is in communication with the second application 203. The application adapter 126 and 128 returns the URL and the first application 201 receives the URL from the functional adapter 124. The first application 201 generates the link using the URL and includes the link in a web page visible to the user. When the user clicks on the link, the user navigates to the second application 203. Where the second application 203 does not provide web access to the engine objects 114, an intermediate web application may be used to field web requests to view engine objects 114. The application adapter 126 and 128 may return the URL to the intermediate web application. The intermediate web application may be included in the system 100.

Figure 4:
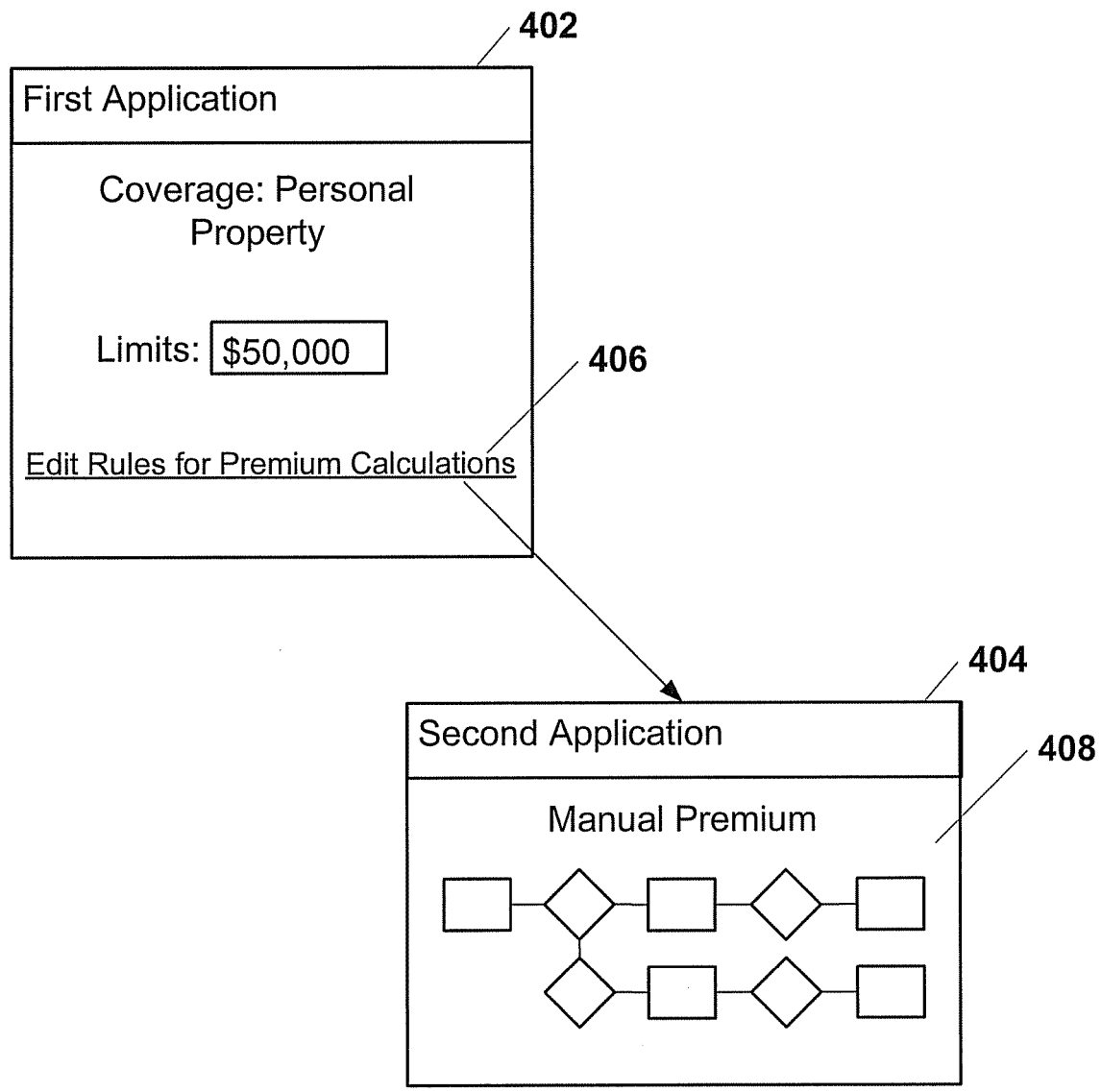
FIG. 4 is an illustration of two display screens of corresponding integrated applications.

FIG. 4 is an illustration of two display screens 402 and 404 of corresponding integrated applications, such as the application 102 and one of the other applications 104 or 106. The first application 201 may generate a first display screen 402 that includes information related to the component 112 of the first application 201. The first display screen 402 may include a link 406. The link may be any user input control operable to receive a selection signal by the user, such as a hyperlink, <HREF> elements in Hypertext Markup Language, buttons, or tabs. The link may include the URL obtained from the Generate URL request in connection with the component 112 of the first application 201. If the user selects the link 406, the user may navigate to the second display screen 404 that is generated by the second application 203. The second display screen 404 may include information 408 related to the engine object 114 of the second application 203, where the engine object 114 is associated with the component 112 of the first application 201.

As described in Table 1, the functional adapter 124 may also make a Deploy Object Model request. One of the other applications 104 and 106 that are in communication with the application adapter 126 and 128 may be able to use information about an object model that includes a description of the component types 116 arranged in the first hierarchical structure 202. For example, most commercially available rules engines permit the entry of the object model. The object model may then be used in the authoring of rules as well as during runtime execution of the rules. In general, the object model may be represented using an XML Schema Definition (XSD). The XSD is an instance of an XML schema written in XML Schema. XML Schema was published as a World Wide Web (W3C) recommendation and is one of several XML schema languages. The XSD may identify a type of XML document in terms of constraints upon what elements and attributes may appear, upon the relationship between the elements and attributes, and upon the types of data contained therein. Thus, the XSD may be used to represent the object model that includes the description of the component types 116 arranged in the first hierarchical structure 202. The XSD is included in the Object Model XSD, which is one of the Input Data Objects of the Deploy Object Model request described in Table 1. In response to the Deploy Object Model request, the application adapter 126 and 128 may convert the Object Model XSD into a format useable by the other application 104 and 106 that is in communication with the application adapter 126 and 128. Additionally or alternatively, the application adapter 126 and 128 may initiate an import of the object model into the other application 104 and 106 that is in communication with the application adapter 126 and 128.

Figure 5:
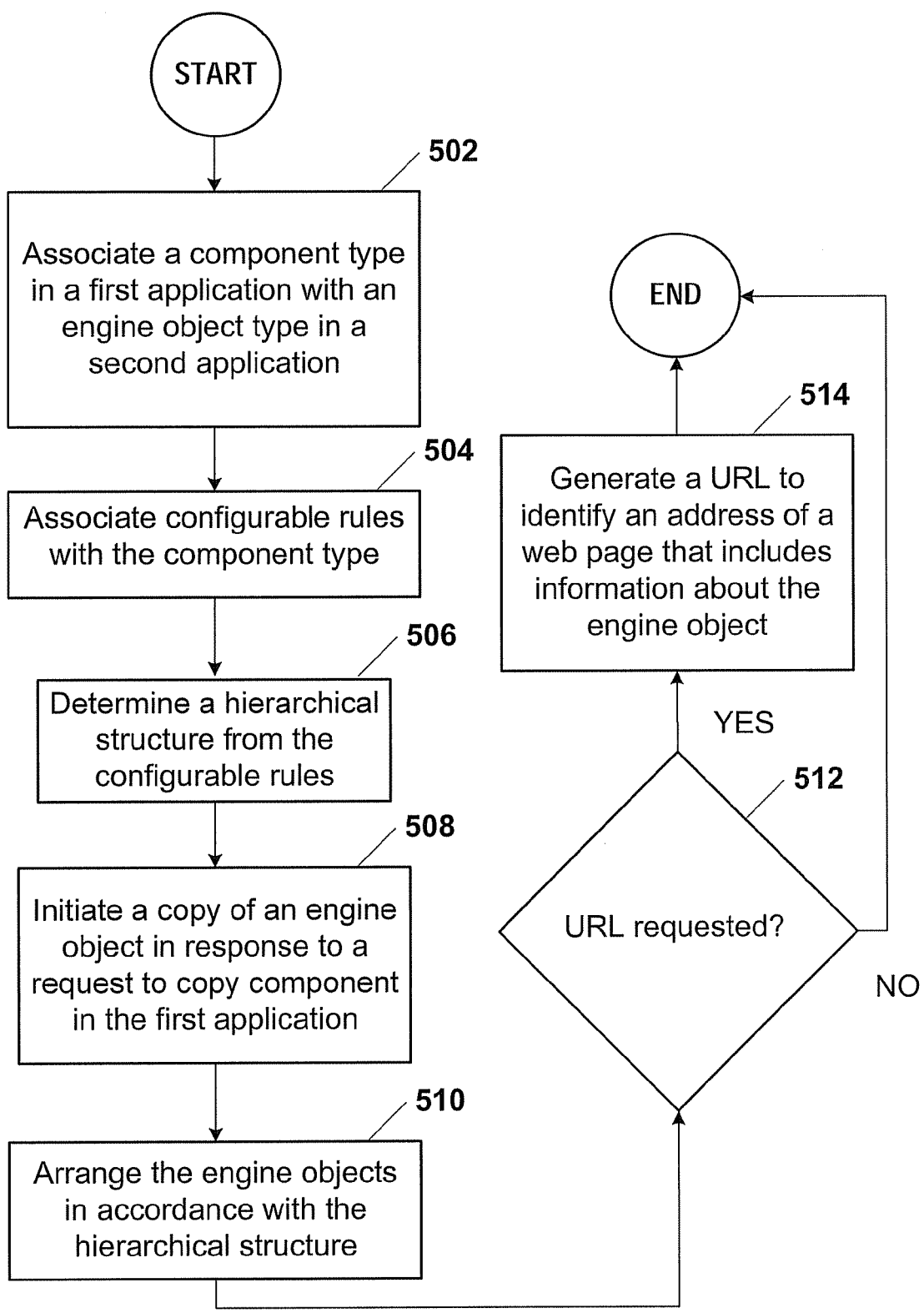
FIG. 5 is a flow diagram illustrating an example operation of a system to integrate a first application with a second application.

FIG. 5 is a flow diagram illustrating an example operation of the system 100 to integrate the first application 201 with the second application 203. Additional, different, or fewer steps may be performed in other examples. The steps may also be performed in a different order than illustrated in FIG. 5.

The operation begins, at block 502, by associating the component type 116 in the first application 201 with the engine object type 118 in the second application 203. The engine object type 118 may be included in the hierarchical structure 204 that includes multiple engine object types 118.

The operation may continue, at block 504, by associating one or more configurable rules with the component type. The operation may, at block 506, further continue by determining the hierarchical structure 204 of the second application 203 from the configurable rules.

At block 508, the operation may, in response to receipt of a request to copy the component 112 in the first application 201, continue by initiating a copy of the engine object 114 in the second application 203. The component 112 may be of the component type 116, and the engine object 114 may be of the engine object type 118. The engine object 114 may be included among multiple engine objects 114, where each of the engine objects 114 is of a corresponding one of the engine object types 118. At block 510, the operation may continue by arranging the engine objects 114 in accordance with the hierarchical structure 204 of the second application 203 determined from the configurable rules.

If the URL is requested by the first application 201 for the engine object 114 at block 512, the operation may continue to block 514 by generating the URL to identify an address of the second display screen 404 that includes information 408 about the engine object 114. Otherwise, the operation may complete.

In other examples, the operation may include additional steps. For example, the operation may include, prior to block 502, determining an order in which to create the engine objects from the configurable rules when the engine objects were first created.

The components 112 and the engine objects 114 in the application 102 and the other applications 104 and 106 respectively, may be associated and thus operated on together. The components 112 associated with the engine objects 114 may be dissimilar program objects. Nevertheless, through the integration between the application 102 and the other applications 104 and 106, the components 112 and the engine objects 114 may be managed from the application 102. Editing or viewing of the components 112 and the engine objects 114 may still be handled by the respective one of the applications.

In addition to managing the creation, deletion, versioning, and deployment of engine objects 114 from the application 102, the hierarchical structure of the components 112 may be different from the corresponding hierarchical structure of the associated engine objects 114. Configurable rules enable easy customization of a desired structure or naming convention. Generating URLs for one or more of the engine objects 114 enables seamless integration at the engine object 114 level.

All of the discussion, regardless of the particular implementation described, is exemplary in nature, rather than limiting. For example, although selected aspects, features, or components of the implementations are depicted as being stored in memories, all or part of systems and methods consistent with the innovations may be stored on, distributed across, or read from other machine-readable media, for example, secondary storage devices such as hard disks, floppy disks, and CD-ROMs; a signal received from a network; or other forms of ROM or RAM either currently known or later developed. Moreover, the various modules and screen display functionality is but one example of such functionality and any other configurations encompassing similar functionality are possible.

Furthermore, although specific components of innovations were described, methods, systems, and articles of manufacture consistent with the innovation may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. Programs may be parts of a single program, separate programs, or distributed across several memories and processors.

While various embodiments of the innovation have been described, it will be apparent to those of ordinary skill in the art that many more embodiments and implementations are possible within the scope of the innovation. Accordingly, the innovation is not to be restricted except in light of the attached claims and their equivalents.

We claim:

1. A system to integrate a first application with a second application, the system comprising:
a memory; and
a processor in communication with the memory, the memory comprising computer code stored therein, the computer code comprising:
computer code executable with the processor to associate a component type in the first application with an engine object type in the second application, wherein the component type is included in a first hierarchical structure comprising a plurality of component types, the engine object type is included in a second hierarchical structure comprising a plurality of engine object types, and the second hierarchical structure is different than the first hierarchical structure;
computer code executable with the processor to determine the second hierarchical structure from a plurality of configurable rules associated with the component type;
computer code executable with the processor to initiate a copy of an engine object that is in the second application in response to a request to copy a component that is in the first application, wherein the component is of the component type, the engine object is of the engine object type, the engine object and a plurality of child objects of the engine object are included in a plurality of engine objects, each of the engine objects is of a corresponding one of the engine object types, and the engine objects are arranged in accordance with the second hierarchical structure;
computer code executable with the processor to initiate a copy of the child objects of the engine object that are in the second application based on the configurable rules in response to the request to copy the component that is in the first application, wherein copies of the child objects of the engine object in the second application are arranged in accordance with the second hierarchical structure that is different than the first hierarchical structure in which any child objects of the component are arranged, wherein a property of a respective one of the engine objects is determined from each of the configurable rules, and a property value of the property of the respective one of the engine objects is determined from each of the configurable rules based on a component property of at least one of a plurality of components of the first application, the components of the first application comprising the component;
a functional adapter; and
an application adapter, wherein the application adapter is executable with the processor to transmit data about the engine object to the functional adapter after creation of the engine object, and wherein the functional adapter is executable with the processor to transmit the data back to the application adapter in order to initiate the copy of the engine object.

2. The system of claim 1, wherein the computer code further includes computer code executable with the processor to initiate creation of a new version of the engine object in response to a request to create a new version of the component.

3. The system of claim 1, wherein the computer code further includes computer code executable with the processor to initiate deletion of the engine object in response to a request to delete the component.

4. The system of claim 1, wherein the computer code further includes computer code executable with the processor to initiate deletion of two or more of the engine objects in response to a request to delete the component in the first application.

5. The system of claim 1, wherein the computer code further includes computer code executable with the processor to generate a Universal Resource Locator to access the engine object in a user interface of the second application.

6. The system of claim 1, wherein the configurable rules include instructions in a text-based language to determine the property values of the engine objects.

7. The system of claim 1, wherein the data about the engine object is transmitted to the functional adapter in an Extensible Markup Language format.

8. A non-transitory computer readable medium encoded with computer executable instructions executable with a processor, the computer readable medium comprising:
instructions to associate a component type in a first application with an engine object type in a second application, wherein the component type is included in a first hierarchical structure comprising a plurality of component types, the engine object type is included in a second hierarchical structure comprising a plurality of engine object types, and the second hierarchical structure is different than the first hierarchical structure;
instructions to determine the second hierarchical structure from a plurality of configurable rules associated with the component type;
instructions to initiate a copy of an engine object that is included in the second application in response to a request to copy a component that is included in the first application, wherein the component is of the component type, the engine object is of the engine object type, the engine object and a plurality of child objects of the engine object are included in a plurality of engine objects, each of the engine objects is of a corresponding one of the engine object types, and the engine objects are arranged in accordance with the second hierarchical structure;
instructions to initiate a copy of the child objects of the engine object that are in the second application based on the configurable rules in response to the request to copy the component that is in the first application, wherein copies of the child objects of the engine object in the second application are arranged in accordance with the second hierarchical structure that is different than the first hierarchical structure in which child objects of the component are arranged, wherein a property of a respective one of the engine objects is determined from each of the configurable rules, and a property value of the property of the respective one of the engine objects is determined from each of the configurable rules based on a component property of at least one of a plurality of components of the first application, the components of the first application comprising the component;
a functional adapter; and
an application adapter, wherein the application adapter is executable with the processor to transmit data about the engine object to the functional adapter, and wherein the functional adapter is executable with the processor to transmit the data back to the application adapter when the copy of the engine object is initiated.

9. The non-transitory computer readable medium of claim 8, further comprising instructions to generate a Universal Resource Locator including an address of a web page, wherein the web page includes information about the engine object.

10. The non-transitory computer readable medium of claim 8, further comprising instructions to initiate an import of an object model of the first hierarchical structure into the second application.

11. The non-transitory computer readable medium of claim 8, wherein the configurable rules associated with the component type vary based on an effective date of the configurable rules.

12. A method of integrating a first application and a second application, the method comprising:

associating, with a processor, a component type in the first application with an engine object type in the second application, wherein the engine object type is included in a hierarchical structure comprising a plurality of engine object types;

associating, with the processor, a plurality of configurable rules with the component type;

determining the hierarchical structure with the processor from the configurable rules;

initiating, with the processor, a copy of an engine object from among a plurality of engine objects included in the second application in response to a request to copy a component in the first application, wherein the component is of the component type, the engine object is of the engine object type, the engine objects comprise the engine object and a plurality of child objects of the engine object, and each of the engine objects is of a corresponding one of the engine object types, wherein an application adapter transmits data about the engine object to a functional adapter after creation of the engine object, and wherein the functional adapter transmits the data back to the application adapter when initiating the copy of the engine object;

initiating, with the processor in response to the request to copy the component in the first application, a creation of copies of the child objects of the engine object in the second application based on the configurable rules;

arranging, with the processor, the copies of the child objects of the engine object in accordance with the hierarchical structure that is different than a hierarchical structure in which child objects of the component in the first application are arranged;

determining from each of the configurable rules a property of a respective one of the engine objects; and determining, from each of the configurable rules, a property value of the property of the respective one of the engine objects based on a component property of at least one of a plurality of components of the first application, the components of the first application comprising the component.

13. The method of claim 12, further comprising initiating creation of a new version of the engine object in the second application in response to a request to create a new version of the component.

14. The method of claim 12, further comprising initiating deletion of the engine object included in the second application in response to a request to delete the component.

15. The method of claim 12, further comprising initiating creation of at least one of the engine objects in accordance with the configurable rules in response to a request to create the component.

16. The method of claim 12, further comprising generating a Universal Resource Locator to identify an address of a web page of the second application, wherein the web page includes information about the engine object.

17. The method of claim 12, further comprising determining an order in which to create the engine objects from the configurable rules.

* * * * *